Aug. 23, 1955  N. J. POUX  2,715,759
SLIDE FASTENING DEVICE
Filed July 1, 1954  3 Sheets-Sheet 1
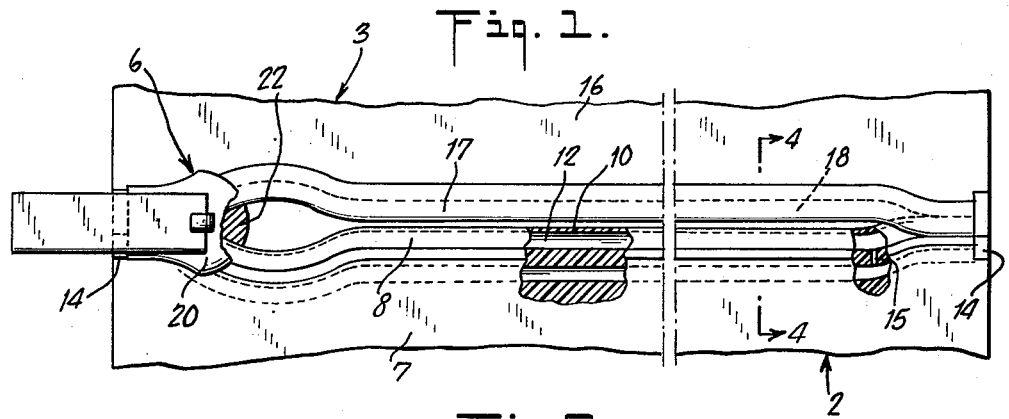
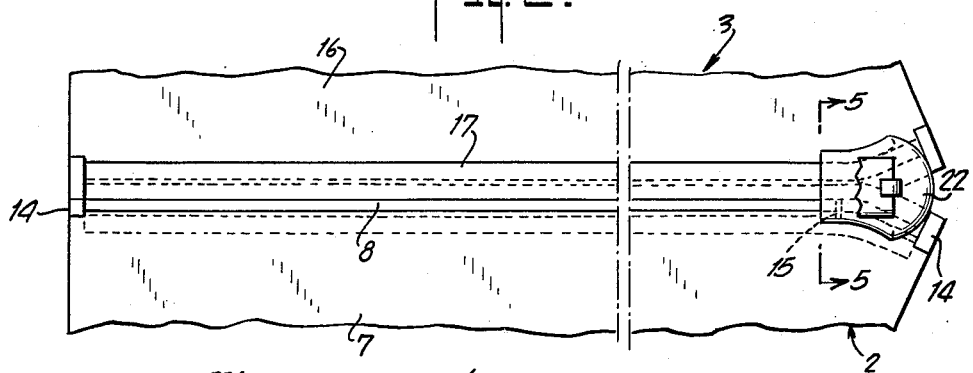
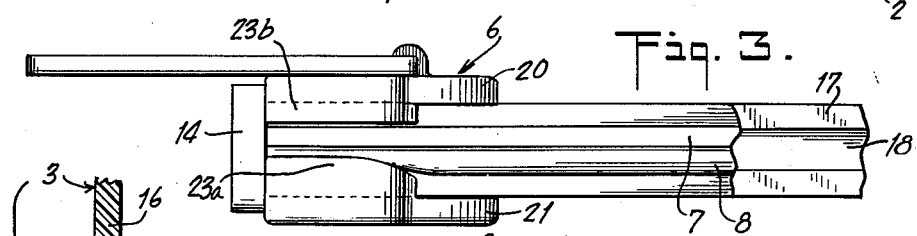
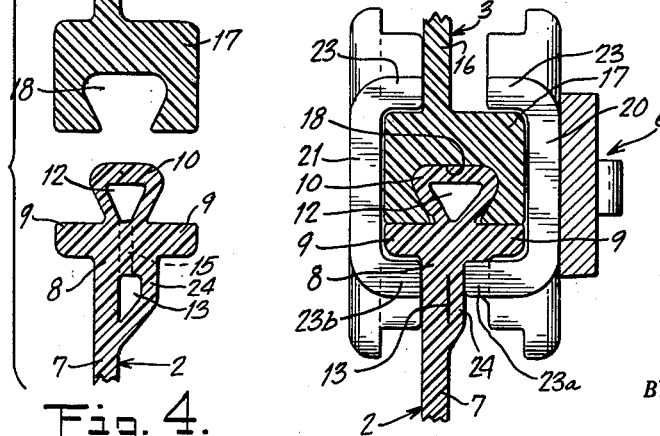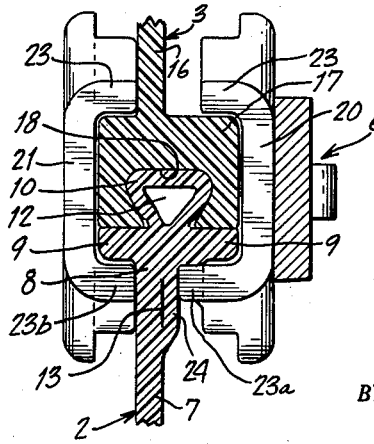
INVENTOR.
NOEL J. POUX
BY R. E. Meech
ATTORNEY Aug. 23, 1955    N. J. POUX    2,715,759
SLIDE FASTENING DEVICE
Filed July 1, 1954    3 Sheets-Sheet 2
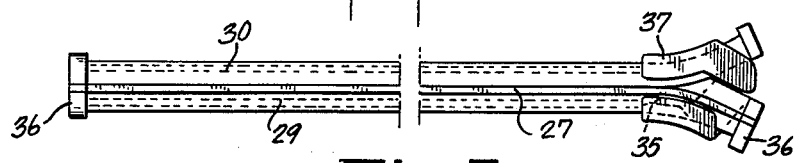
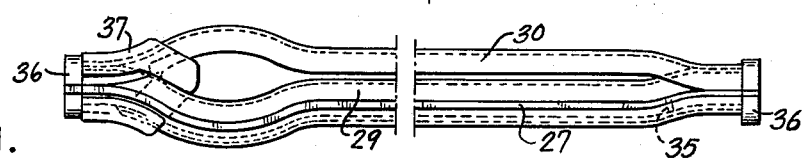
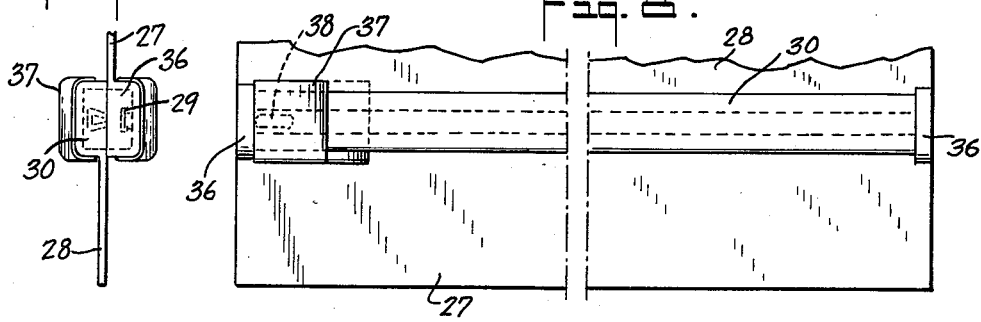
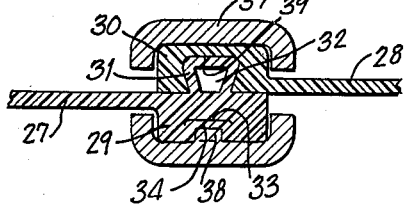
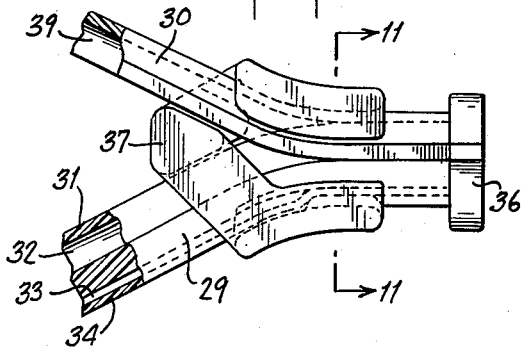
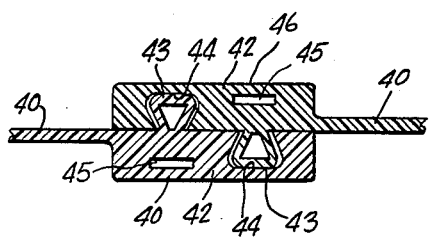
INVENTOR.
NOEL J. POUX
BY R. E. Meech
ATTORNEY Aug. 23, 1955 N. J. POUX 2,715,759
SLIDE FASTENING DEVICE
Filed July 1, 1954 3 Sheets-Sheet 3
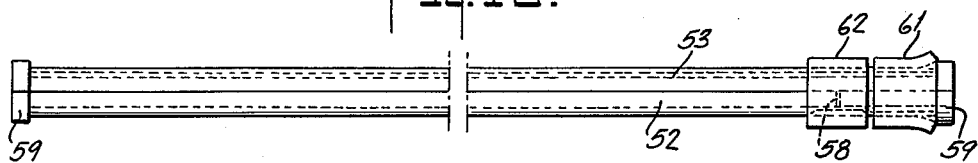
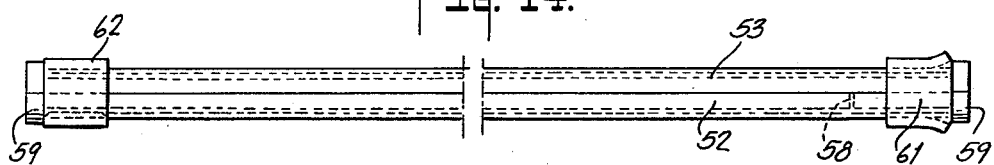
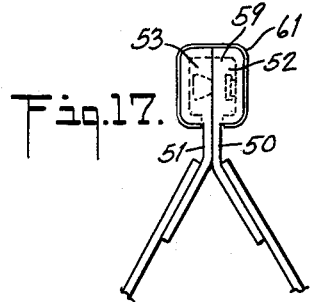
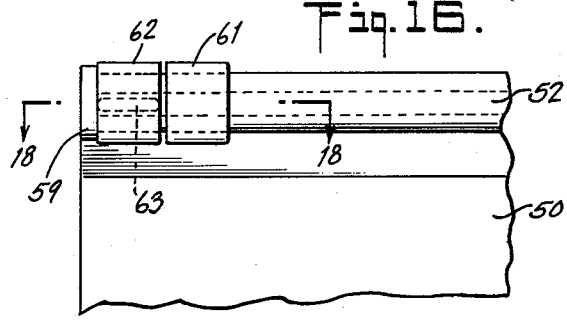
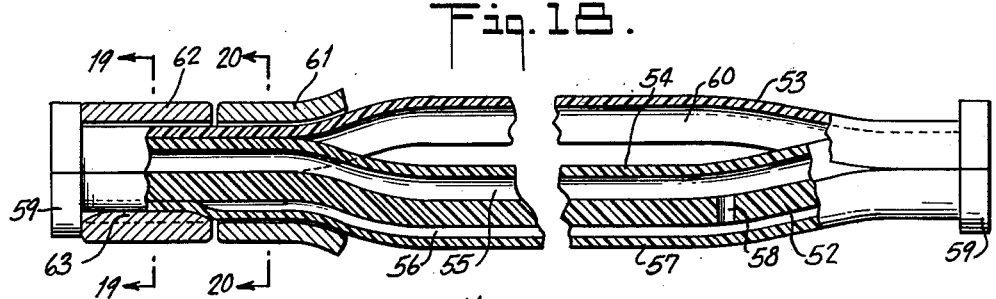
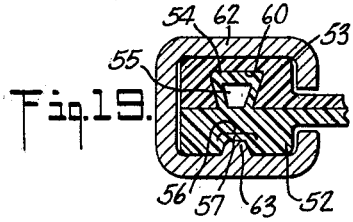
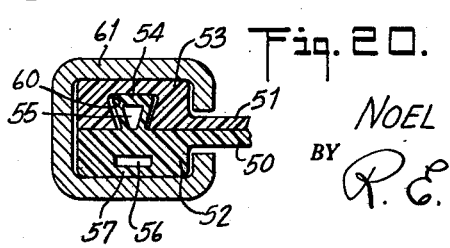
INVENTOR.
NOEL J. POUX
BY
R. E. Meech
ATTORNEY

United States Patent Office 2,715,759
Patented Aug. 23, 1955

2,715,759

SLIDE FASTENING DEVICE

Noel J. Poux, Meadville, Pa., assignor to Talon, Inc., a corporation of Pennsylvania Application July 1, 1954, Serial No. 440,593

12 Claims. (Cl. 24—201)

This invention relates to fastening devices and, more particularly to that type of fastener made from continuous strip members which are provided with continuous longitudinal interlocking male and female portions and which are usually engaged and disengaged by means of a slide co-operating with the strip members.

Such slide fasteners of the type to which the present invention relates comprises generally two separable strips having a continuous rib-like portion on one strip adapted to be positioned in interlocking engagement in a continuous groove or channel in the oppposed strip usually by means of a suitable slide member. Various fastening devices of this type have been heretofore suggested and used but have not been successful for several reasons. In most of these, they were so designed that they did not possess the required mechanical strength to hold the strips together especially when subjected to reasonable transverse forces. Others were so constructed and arranged that they were difficult to manipulate to open and close the fastener. In others the design required relatively large clearances between the interlocking parts which resulted in a weak and leaky fastener. Also, others were impractical in that they were complicated in design and expensive in their manufacture.

It is the general object of the present invention to provide a slide-operated fastening device of the type above described which is an improvement over known fasteners of this type in its ability to provide an uninterrupted and continuous closure throughout its length in the manner in which the strips hold together against faces tending to separate them, and to avoid the above mentioned disadvantages of this type of fastener.

It is another object of the invention to provide a fastening device of this type having two continuous interengaging portions interlocked together in such a manner that a substantially air-tight closure is provided.

It is a further object of this invention to provide a fastening device of the type above described which is simple and inexpensive in its construction and that the two strips may be easily extruded or otherwise formed having a minimum number of parts and interlocking projections and recesses and easy to manipulate.

It is a more specific object of this invention to provide an improved fastening device of this type wherein there is provided a continuous hollow rib-like portion on one of the strips which is held securely in the channel or groove of the opposed strip by inflating the rib-like portion when it is positioned in the groove or channel and which rib-like portion is automatically inflated by action of the slider as it is moved along the strips to interengage the same.

Various other objects and advantages of this invention will be more apparent in the course of the following specification, and will be particularly pointed out in the appended claims.

In the accompanying drawings, there is shown for the purpose of illustration, an embodiment and several modifications thereof which my invention may assume in practice.

In these drawings:

Fig. 1 is a plan view, partly in section, of one form of fastening device in accordance with the present invention, showing it in open position, Fig. 2 is a plan view of the same, showing it in closed position, Fig. 3 is an enlarged side elevational view of one end of the fastener as shown in Fig. 1, Fig. 4 is a sectional view taken on line 4—4 of Fig. 1, Fig. 5 is a sectional view taken on line 5—5 of Fig. 2, Fig. 6 is a plan view of another form of fastening device in accordance with my invention, showing it in closed position, Fig. 7 is a plan view of the same, showing it in open position, Fig. 8 is a bottom view thereof, Fig. 9 is an end view of the same, Fig. 10, is an enlarged plan view, partly in section, of one end of the fastening device as shown in Fig. 7, Fig. 11 is a sectional view taken on line 11—11 of Fig. 10, Fig. 12 is a cross-sectional view similar to Fig. 11 but showing a modified form of my fastening device, Fig. 13 is a plan view similar to Figs. 2 and 6 showing still another form of fastening device of my invention, showing it in its fully closed position, Fig. 14 is a plan view of the same, showing it in its partially closed position, Fig. 15 is a plan view thereof similar to Figs. 13 and 14, showing this modification in its open position, Fig. 16 is an enlarged elevational view of one end of this fastening device as shown in Fig. 15, Fig. 17 is an end view of this latter modification, Fig. 18 is a sectional view taken on line 18—18 of Fig. 16, Fig. 19 is a sectional view taken on line 19—19 of Fig. 18, and Fig. 20 is a sectional view taken on line 20—20 of Fig. 18.

Referring more particularly to the drawings, there is shown in Figs. 1 through 5, one form of the fastening device of the present invention which comprises a pair of flexible strips 2 and 3 having marginal interlocking portions. These strips are formed preferably by extrusion from rubber or some other suitable flexible plastic material. There is arranged on these marginal portions, a slider 6 for longitudinal movement therealong for engaging and disengaging these marginal interlocking portions in a well known manner.

As more clearly shown in Figs. 4 and 5, the strip 2 has a flat, relatively thin web portion 7 and a marginal portion 8 which is substantially thicker than the web portion. There is carried by the marginal portion flange-like portions or shoulders 9 and there is arranged along the outer side thereof a continuous longitudinally extending hollow rib-like portion 10 so as to provide an air passageway or chamber 12 therein which rib-like portion is substantially dovetail shape in cross section. In the inner side of this marginal 8, there is arranged a continuous longitudinally extending air chamber or passageway 13 which is substantially parallel to the rib-like portion 10. This passageway 13 and the web-like portion 10 are sealed at each end as at 14 so as to seal the passageway and rib-like portion against the escape of air therefrom. At one end of this marginal portion there is arranged a relatively small transversely extending passageway 15 connecting the passageway 13 with the hollow portion 12 of the rib-like portion 10.

The other strip 3 likewise has a flat relatively thin web portion 16 and a thickened marginal portion 17. There is arranged in the outer side of this marginal portion a continuous longitudinally extending channel 18 having a cross section which corresponds substantially to that of the rib-like portion 10 with which it is adapted to co-operate. That is, the rib-like portion 10 is adapted to be inserted in the channel 18 and inflated therein upon movement of the slider 6 along the marginal portions 8 and 17 in a manner to be presently described.

The slider 6 consists generally of a pair of wing portions 20 and 21 connected together at one end by a neck portion 22 and having marginal flange portions 23 so as to provide substantially a Y-shaped channel therein. One of the flange portions, designated at 23a, is slightly longer than the other flange portions and is disposed opposite and in abutting arrangement with a resilient wall 24 carried by the marginal portion 10 which wall is arranged directly opposite the air passageway or chamber 13 therein. This flange portion 23a co-operates with the opposed flange portion 23b to compress and collapse this wall 24 when the slider is moved therealong.

Having described the construction of this form of my improved fastening device, it functions in the following manner. It will be assumed that the fastener is open and the marginal portions 8 and 17 separated as shown in Fig. 1 of the drawings with the slider 6 positioned at its extreme open end position. To close the fastener the slider is moved toward the opposite end of the fastener, or to the right as shown in Fig. 2, so as to position the rib-like portion 10 of the marginal portion 8 in the channel 18 of the marginal portion 17. As the slider is moved along, the flange portion 23a compresses and collapses the resilient wall 24 thereby forcing the air from the passageway 13, through the transverse passageway 15 and into the hollow portion or chamber 12 so as to inflate the rib-like portion 10. As a result the outer surfaces of the rib-like portion 10 are forced tightly against the inner surfaces of the channel 18 so as to provide a rather secure sealing contact therebetween. When the slider has been moved to its fully closed position, as shown in Fig. 2, the flange portion 23a will be disposed directly opposite the transverse passageway thereby closing the same to the passageway 13 so as to prevent the escapement of air from the hollow portion or chamber 12 of the rib-like portion 10.

When it is desired to open the fastener, the slider 6 is moved in a reverse direction, or to the left as shown in Fig. 2, and in so doing the rib-like portion 10 is moved out of the channel 18 and the air in the hollow portion or chamber 12 of the rib-like portion is permitted to escape therefrom and pass back into the passageway 13 through the transverse passageway 15.

In Figs. 6 through 11, there is shown a modified form of fastener structure in accordance with the present invention. In this construction there is provided a pair of strips having flat, relatively thin web portions 27 and 28 and thickened marginal portions 29 and 30, respectively, disposed in overlapping relation when in interlocked position. There is arranged along the inner side surface of the marginal portion 29, a continuous longitudinally extending hollow rib-like portion 31 so as to provide a passageway or air chamber 32 therein. In this marginal portion 29 there is arranged a continuous longitudinally extending passageway or chamber 33 having a relatively thin resilient wall 34 arranged on the outer side thereof. Adjacent the closed end of the marginal portion 29, there is arranged a transverse passageway 35 which connects the passageway 33 with the hollow portion or chamber 32 in the rib-like portion 31. The ends of both the passageway 33 and chamber 32 are sealed, as at 36.

The other strip has a continuous longitudinally extending channel 39 arranged in the opposed side surface of the marginal portion 30 corresponding substantially in cross section to that of the rib-like portion 31 with which it co-operates in a manner as before.

The slider 37 is constructed substantially in the same manner as before except there is provided a projecting portion 38 arranged on the inner face of the lower wing thereof which projects into the channel therein, as more clearly shown in Fig. 11 of the drawings.

The operation of this structure is the same as before with the projecting portion 38 acting to compress and collapse the resilient wall 34 as the slider is moved along the marginal portions 29 and 30 so as to force the air out of the passageway 33, through the transverse passageway 35 and into the passageway or chamber 32 of the rib-like portion 31 thereby inflating the same. When the slider is disposed in its fully closed position at one end of the fastener, as shown in Fig. 6, the projecting portion 38 will be disposed opposite and over the transverse passageway 35 thereby preventing the escapement of the air from the passageway or chamber 32.

Another modified form of the invention is shown in Fig. 12. This construction is similar to that just described but differs therefrom in that there is provided two interlocking portions. As shown in this figure, there is provided two identical opposed strips having web portions 40 and thickened marginal portions 42 which are disposed in overlapping relation and are identical in cross section. On each of the marginal portions there is provided a continuous longitudinally extending hollow rib-like portion 43 and a longitudinally extending channel 44 substantially corresponding in cross section. There is also provided a longitudinally extending air passageway or chamber 45 in each of the marginal portions 42 having a relatively thin resilient outer wall 46.

In Figs. 13 through 20 there is shown another modification. In this construction there is likewise provided a pair of strips having flat, relatively thin web portions 50 and 51 and thickened marginal portions 52 and 53, respectively, disposed in overlapping relation when in interlocked position. As before, there is arranged along the inner side surface of the marginal portion 52, a continuous longitudinally extending hollow rib-like portion 54 so as to provide a passageway or air chamber 55 therein. In this marginal portion there is arranged a continuous longitudinally extending passageway or chamber 56 having a relatively thin resilient wall 57 arranged on the outer side thereof. Adjacent the closed end of the marginal portion 52, there is arranged a transverse passageway 58 which connects the passageway 56 with the hollow portion or chamber 55 of the rib-like portion 54, as before. The ends of both the passageway 56 and chamber 55 are sealed, as before, at each end, as at 59, so as to prevent the escapement of air therefrom.

The other strip has a continuous longitudinally extending channel 60 arranged in the opposed side face of the marginal portion 53 corresponding substantially in cross section to that of the rib-like portion 54 with which it co-operates to interlock the strips in the same manner as previously described.

In this embodiment, there is provided a channeled slider 61 which is arranged on the marginal portions 52 and 53 for longitudinal movement therealong for engaging the rib-like portion 54 with the channel 60 and closing the fastener. There is also arranged on the marginal portions 52 and 53, a similar slidable member 62 having a projecting portion 63 arranged on the inner side of the wall thereof which co-operates with the relatively thin resilient wall 57 in a manner as previously described. It is the purpose of the slider 61 to interengage the marginal portions i. e. to position the web-like portion 54 in the channel 60 and this member is first moved along the marginal portions from right to left as shown in Fig. 15, so as to be disposed at the closed end of the fastener, as shown in Fig. 14. The slidable member 62 is then moved along the marginal portions and in so doing, as before, the projecting portion 63 carried thereby compresses and collapses the resilient wall 57 thereby forcing the air from the passageway 56, through the transverse passageway 58 and into the hollow portion or chamber 55 of the rib-like portion 54 so as to inflate the same. When this slidable member 62 is moved to its extreme position at the closed end of the fastener directly next to the slider 61, as shown in Fig. 13, it will be understood that the projecting portion 63 will be disposed opposite the transverse passageway 58 so as to prevent escapement of the air from the hollow portion or chamber 55 in the rib-like portion 54.

In all forms of construction heretofore described and shown, it will be seen that the parts of the fastening device in each instance consist of elongated strips, the marginal or interlocking portions of which are provided with continuous hollow rib-like portions which are adapted to be inserted into and inflated in the channel of the opposed marginal portions of the opposed strips with means slidably engaging the marginal portions for permitting the insertion of the rib-like portion into the channel and the removal of the same therefrom including means carried by the slidable means for inflating the rib-like portions and trapping the air therein.

While I have shown and described several embodiments which my invention may assume in practice, it will be understood that these embodiments are merely for the purpose of illustration and description, and that other forms may be devised within the scope of my invention as defined in the appended claims.

What I claim as my invention is:

1. A fastening device of the class described comprising a pair of opposed elongated strips of flexible material, each of said strips having a web portion and a thickened marginal portion, one of said strips having a continuous longitudinally extending hollow rib-like portion arranged along the marginal portion thereof, the other of said strips having a longitudinally extending continuous channel arranged in the marginal portion thereof, the cross section of which corresponds substantially to that of said rib-like portion, said rib-like portion adapted to be inserted into said channel and inflated therein, the marginal portion of said first-mentioned strip having a longitudinally extending continuous passageway arranged therein substantially parallel to said rib-like portion carried thereby, the hollow portion of said rib-like portion and said passageway being sealed at each end, and a transversely extending passageway arranged in the marginal portion of said first-mentioned strip adjacent one end thereof connecting said first-mentioned passageway with the hollow portion of said rib-like portion.

2. A fastening device of the class described, as defined in claim 1, including means for forcing the air out of the first-mentioned passageway, through the second-mentioned passageway and into the hollow portion of said rib-like portion for inflating the same.

3. A fastening device of the class described, as defined in claim 1, including a member slidably arranged on the marginal portion of said strip for longitudinal movement therealong, said member adapted to collapse the material along the outer side of said first-mentioned passageway as said member is moved along whereby the air in said first-mentioned passageway is forced therefrom through said second-mentioned passageway and into the hollow portion of said rib-like portion.

4. A fastening device of the class described, as defined in claim 1, including a slider arranged on the marginal portions of said strips for longitudinal movement therealong for engaging and disengaging said marginal portions, said slider having means carried thereby which collapses the material along the outer side of said first-mentioned passageway as the slider is moved along in a closing direction whereby the air in said first-mentioned passageway is forced therefrom, through said second-mentioned passageway and into the hollow portion of said rib-like portion.

5. A fastening device of the class described comprising a pair of opposed elongated strips of flexible material, each of said strips having a web portion and a thickened marginal portion, one of said strips having a continuous longitudinally extending hollow rib-like portion arranged along the marginal portion thereof, the other of said strips having a longitudinally extending continuous channel arranged in the marginal portion thereof, the cross section of which corresponds substantially to that of said rib-like portion, said rib-like portion adapted to be inserted into said channel and inflated therein, the marginal portion of said first-mentioned strip having a longitudinally extending continuous passageway arranged therein substantially parallel to said rib-like portion carried thereby and an outer resilient wall arranged directly opposite said passageway, the hollow portion of said rib-like portion and said passageway being sealed at each end, and a transversely extending passageway arranged in the marginal portion of said first-mentioned strip adjacent one end thereof connecting said first-mentioned passageway with the hollow portion of said rib-like portion.

6. A fastening device of the class described, as defined in claim 5, including means cooperating with said resilient wall for forcing the air out of the first-mentioned passageway, through the second-mentioned passageway and into the hollow portion of said rib-like portion for inflating the same.

7. A fastening device of the class described, as defined in claim 5, including a member slidably arranged on the marginal portion of said strip for longitudinal movement therealong, said member having means carried thereby which cooperates with said resilient wall to collapse the same as said member is moved along whereby the air in said first-mentioned passageway is forced therefrom, through said second-mentioned passageway and into the hollow portion of said rib-like portion.

8. A fastening device of the class described, as defined in claim 5, including a slider arranged on the marginal portions of said strips for longitudinal movement therealong for engaging and disengaging said marginal portions, said slider having means carried thereby which cooperates with said resilient wall to collapse the same, as the slider is moved along in a closing direction whereby the air in said first-mentioned passageway is forced therefrom, through said second-mentioned passageway and into the hollow portion of said rib-like portion.

9. A fastening device of the class described comprising a pair of opposed elongated strips of flexible material, each of said strips having a web portion and a thickened marginal portion, said marginal portions overlapping one another when in interlocked position, one of said strips having a continuous longitudinally extending hollow rib-like portion arranged along the marginal portion thereof, the other of said strips having a longitudinally extending continuous channel arranged in the marginal portion thereof, the cross section of which corresponds substantially to that of said rib-like portion, said rib-like portion adapted to be inserted into said channel and inflated therein, the marginal portion of said first-mentioned strip having a longitudinally extending continuous passageway arranged therein substantially parallel to said rib-like portion carried thereby and an outer relatively thin resilient wall arranged directly opposite said passageway, the hollow portion of said rib-like portion and said passageway being sealed at each end, and a transversely extending passageway arranged in the marginal portion of said first-mentioned strip adjacent one end thereof connecting said first-mentioned passageway with the hollow portion of said rib-like portion.

10. A fastening device of the class described, as defined in claim 9, including a channeled slider arranged on the marginal portions of said strips for longitudinal movement therealong for engaging and disengaging said marginal portions, said slider having a projection arranged in the channel thereof which projection cooperates with the relatively thin resilient wall to collapse the same as the slider is moved along in a closing direction whereby the air in said first-mentioned passageway is forced therefrom, through said second-mentioned passageway and into the hollow portion of said rib-like portion.

11. A fastening device of the class described, as defined in claim 9, including a slider arranged on the marginal portions of said strips for longitudinal movement therealong for engaging and disengaging said marginal portions, another member slidably arranged on the marginal portions of said strips for longitudinal movement therealong, said member having means carried thereby which cooperate with the respective relatively thin resilient walls of said marginal portions so as to collapse the same as said member is moved along whereby the air in said first-mentioned passageways is forced therefrom, through their respective second-mentioned passageways, and into the hollow portions of their respective rib-like portions.

12. A fastening device of the class described comprising a pair of opposed elongated strips of flexible material, each of said strips having a web portion and a thickened marginal portion, said marginal portions overlapping one another when in interlocked position and being substantially identical in cross section, each of said marginal portions having a continuous longitudinally extending hollow rib-like portion arranged integral therewith and a longitudinally extending continuous channel, the cross section of each of said channels corresponding to the cross section of their respective rib-like portions, the rib-like portion of one of said marginal portions adapted to be inserted into its opposed channel in the marginal portion of the other strip and inflated therein, the marginal portion of each of said strips having a longitudinally extending continuous passageway arranged substantially parallel to said rib-like portions carried thereby and an outer relatively thin resilient wall arranged directly opposite the respective passageways, and a transversely extending passageway arranged in the marginal portion of each strip adjacent one end thereof connecting each of said first-mentioned passageways with the hollow rib-like portions of their respective marginal portions.

No references cited.